Figure 1:
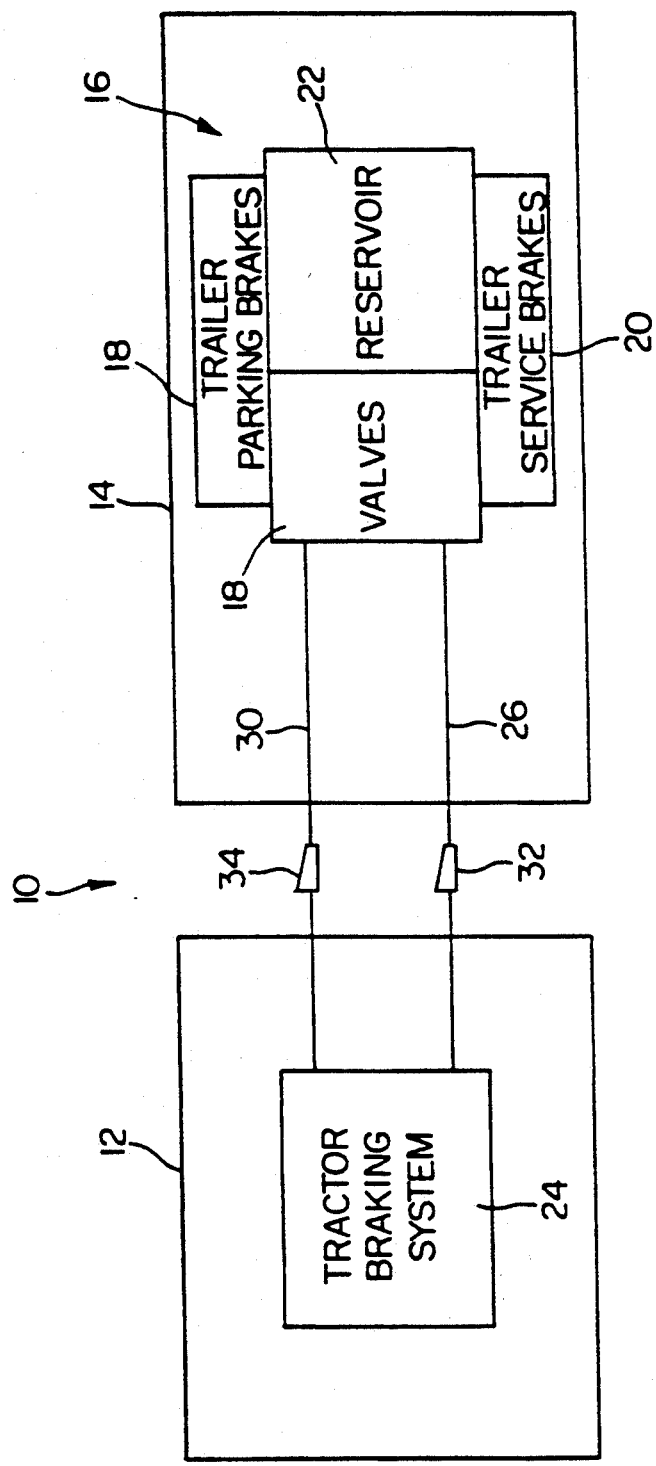

United States Patent [19]

Eberling

[11] Patent Number: 5,251,967
[45] Date of Patent: Oct. 12, 1993

[54] FLUID PRESSURE BRAKING SYSTEM WITH LOW PRESSURE WARNING MECHANISM

[75] Inventor: Charles E. Eberling, Wellington, Ohio

[73] Assignee: Allied-Signal Inc., Morristown, N.J.

[21] Appl. No.: 857,219

[22] Filed: Mar. 25, 1992

[51] Int. Cl.$^5$ .............................................. B60T 13/00
[52] U.S. Cl. ................................... 303/7; 303/DIG. 3
[58] Field of Search ................... 303/7, 8, 9, 9.63, 15, 303/86, DIG. 3; 188/1.11, 153 A

[56] References Cited

U.S. PATENT DOCUMENTS

| | | | |
|---|---|---|---|
| Re. 27,667 | 6/1973 | Ayers, Jr. | 303/7 |
| 2,979,364 | 4/1961 | Putnam. | |
| 3,402,972 | 9/1968 | Cooper et al. | 303/DIG. 3 X |
| 3,503,651 | 3/1970 | Gachot et al. | 303/9 |
| 3,528,707 | 9/1970 | Casey | 303/10 |
| 3,601,451 | 8/1971 | Cummins | 303/9 X |
| 3,690,733 | 9/1972 | Gachot et al. | 303/7 |
| 3,820,854 | 6/1974 | Stearns | 303/9 |
| 3,862,781 | 1/1975 | King et al. | 303/DIG. 3 X |
| 3,901,556 | 8/1975 | Prillinger et al. | 303/13 |
| 3,917,037 | 11/1975 | Prillinger | 303/9 X |
| 3,929,381 | 12/1975 | Durling | 303/9 X |
| 4,455,052 | 6/1984 | Bueler | 303/7 X |
| 4,472,001 | 9/1984 | Fannin | 303/9 |
| 4,586,584 | 5/1986 | Auman et al. | 303/7 X |
| 4,629,256 | 12/1986 | Fannin | 303/7 X |
| 4,673,222 | 6/1987 | Knight | 303/9 |
| 4,736,990 | 4/1988 | Brown et al. | 303/DIG. 3 X |
| 5,000,520 | 3/1991 | Schmitt | 303/DIG. 3 X |

FOREIGN PATENT DOCUMENTS 0043858  2/1988  Japan ........................... 303/7

Primary Examiner—Robert J. Oberleitner
Assistant Examiner—Peter M. Poon
Attorney, Agent, or Firm—Ken C. Decker; William N. Antonis

[57] ABSTRACT

A fluid pressure braking system for a tractor trailer vehicle includes a supply line connecting the tractor and trailer braking systems. A low pressure responsive switch responds to the pressure level in the supply line for actuating a warning device when the pressure level in the supply line drops below a predetermined pressure level to thereby warn the driver before a brake actuation is effected that a low pressure level exists in the trailer braking system. A normally open stoplight switch is connected in series with the low-pressure responsive switch so that the signal generated by the low-pressure responsive switch is prevented from actuating the warning device when the tractor is operated in the "bobtail" mode without a trailer.

13 Claims, 2 Drawing Sheets

FLUID PRESSURE BRAKING SYSTEM WITH LOW PRESSURE WARNING MECHANISM

This invention relates to a fluid pressure braking system for a tractor-trailer combination vehicle.

Modern tractor-trailer combination vehicles require a properly functioning braking system in order to stop safely. If any portion of the braking system malfunctions, an unbalanced braking situation may result. For example, if a malfunction occurs in the trailer braking system while the tractor braking system functions normally, jackknifing may occur. The problem is particularly acute if two or more trailers are involved in so-called "turnpike trains" in which a single tractor pulls two or three trailers.

Tractor-trailer combination vehicles are equipped with a tractor protection system, which closes off the brake lines communicating the tractor with the trailer when the pressure level in the trailer system drops to a very low level. However, braking may be severely impaired in the trailer system at pressure levels far above that set for the tractor protection system to close. In current systems, the vehicle operator has no warning of this low pressure condition in the trailer system until he applies the brakes. Accordingly, a jackknife may occur, which the driver may have been able to compensate for if he had been advised of the low pressure condition before effecting the brake application.

The present invention continually monitors the pressure level in the supply line, through which compressed air is communicated to the storage reservoirs on the trailer. If the pressure level in the supply line drops below a predetermined pressure level, an actuating signal is generated which operates a warning device in the vehicle operator's compartment to appraise the operator of the low pressure condition. The actuating signal is automatically disabled during bobtail operation of the tractor, that is, operation of the tractor without pulling a trailer.

Figure 2:
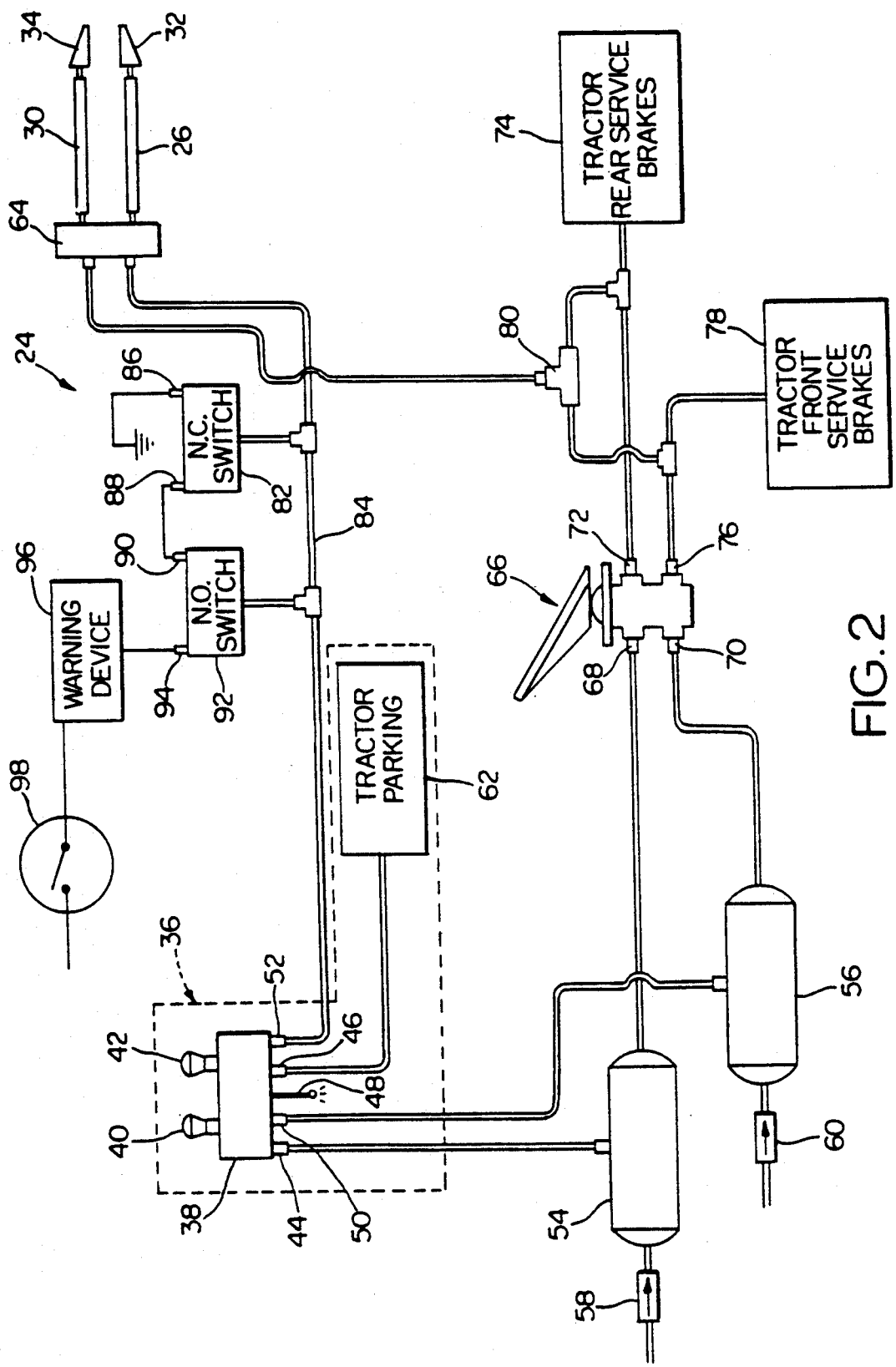

These and other advantages of the present invention will become apparent from the following description, with reference to the accompanying drawings, in which:

FIG. 1 is a schematic illustration of the braking system of the tractor and trailer of a tractor-trailer combination vehicle; and FIG. 2 is a diagrammatic illustration of a vehicle braking system incorporating the warning device of the present invention.

Referring now to the drawings, a tractor-trailer combination vehicle generally indicated by the numeral 10 includes a tractor portion 12 which pulls a cargo trailer portion generally indicated at 14. The trailer portion 14 includes a braking system generally indicated by the numeral 16. Braking system 16 includes trailer parking brake actuators, illustrated schematically as at 18, and trailer service brake actuators, illustrated schematically at 20. Although the parking brake actuators 18 and service brake actuators 20 are shown separately, they are commonly provided in a common tandem actuator at each of the vehicle wheels in a manner well known to those skilled in the art. Trailer braking system 16 further includes one or more reservoirs 22, which are charged by the tractor braking system generally indicated by the numeral 24. Fluid pressure is communicated through supply line 26 from the tractor braking system 24 to the trailer braking system 16. Necessary valves, indicated schematically at 28, control charging of the parking brake actuators 18 and also respond to a pressure signal communicated through service or control line 30 to effect a service brake actuation of the trailer service brakes 20. The service or control line 30 is communicated to the operator-actuated brake valve, which as will be more completely described hereinafter, supplies the necessary control signal to the valves 28.

Although only a single trailer 14 and trailer braking system 16 is illustrated, it is to be understood that two or even three trailers 14 are commonly connected in tandem, each of them including a trailer braking system 16, and that all of the trailer braking systems 16 of a single rig are charged serially by fluid pressure communicated through the supply line 26. Supply line 26 is equipped with conventional gladhand couplers 32 to couple the portions of the supply line 26 carried by the tractor to the portion of the supply line 26 carried by the trailer. Similarly, service or control line 30 is equipped with conventional gladhand couplers 34, which couple the portion of the service or control line 30 on the tractor with the equivalent portion on the trailer.

Referring now to FIG. 2, the tractor braking system 24 includes a parking subsystem generally indicated by the numeral 36. Tractor parking subsystem 36 includes a modular control valve 38, having separate manually actuated control knobs 40, 42, which operate separate valves within the module 38 in a manner well known to those skilled in the art. Valve control knob 40 controls communication between an inlet port 44, an outlet port 46, and an exhaust port 48. Similarly, control knob 42 actuates a valve assembly within the module 38 to control communication between an inlet port 50, an outlet port 52, and the exhaust port 48. Inlet port 44 is communicated with a fluid pressure reservoir 54, and inlet port 50 is communicated with fluid reservoir 56. Each of the reservoirs 54, 56 are charged by the vehicle air compressor (not shown) through one way check valves 58, 60. The aforementioned air compressor is operated by the vehicle engine.

Outlet port 46 is communicated to conventional, spring actuated tractor parking brakes indicated generally at 62. Parking brake 62 are applied by a spring actuator, and are released by supplying holdoff pressure. Accordingly, when the control knob 40 is pushed inward relative to the module 38, the inlet port 44 is communicated to the outlet port 46, thereby supplying holdoff pressure to the parking brakes 62. Conversely, when the control knob 40 is moved to the "out" position relative to the module 38, outlet port 46 is vented to exhaust 48 and inlet port 44 is closed off, thereby venting the holdoff pressure and permitting the aforementioned spring actuator to effect a parking brake application. The outlet port 52 is connected to supply line 26 through a conventional tractor protection valve generally indicated by the numeral 64. Accordingly, when the control knob 42 is pushed to the "in" position, inlet port 50 is communicated to the outlet port 52, thereby supplying pressure to supply line 26 to charge the trailer reservoir 22 and also to supply holdoff pressure to the trailer parking brakes 18. Conversely, when the control knob 42 is moved to the "out" position, the inlet port 50 is shut off, and outlet port 52 is communicated to exhaust 48, thereby venting the supply line 26, to effect a trailer parking brake application. Of course, if the tractor 10 is being run in the "bobtail" mode, that is, without a trailer, the control knob 42 will always be in the "out" position, thereby closing off pressure communication to the supply line 26 and venting the latter to atmosphere. The venting of the supply line pressure results in the tractor protection valve 64 closing communication through the trailer service or control line 30. Both line of pressure communication to the trailer are closed therefore and the tractor can then be operated without a trailer. Furthermore, pressure in supply line 26 will be reduced if a significant leak or other malfunction causes loss of pressure within trailer system 16.

Tractor braking system 24 further includes a conventional, treadle-operated, operator actuated dual brake control valve generally indicated by the numeral 66. Control valve 66 includes an inlet port 68, communicated to the reservoir 54, another inlet port 70, communicated to the reservoir 56, an outlet port 72, communicated to the tractor rear service brakes 74, and an outlet port 76, which is communicated to the front service brakes 78. Accordingly, when the vehicle operator operates the control valve 66, inlet port 68 is communicated to outlet port 72, thereby supplying a service brake actuating signal effecting a brake application of the rear service brake 74, and simultaneously the inlet port 70 is communicated to the outlet port 76, thereby communicating a service brake actuating signal effecting actuation of the front service brakes 78. Both of the outlet ports 72, 76 and control valve 66 are communicated through a conventional double check valve 80, which selects the higher of the pressures at the port 72, 76 and communicates this higher pressure to the trailer service or control line 30, again through the tractor protection valve 64.

Normal operating pressure in the braking systems 16, 24 is in the range of 100-120 psi. The tractor protection valve 64 is set to close off the service or control line 30, thereby disabling the trailer braking system, when the pressure in the supply line 26 drops to approximately 35-45 psi. However, an unbalanced braking situation may occur, even if the pressure in the trailer system is sufficient to render the trailer service brakes functional and is well above the cutoff pressure at which the tractor protection valve 64 is set. For example, a vehicle stability problem may exist if the tractor service braking system is at full pressure and the maximum pressure available in the trailer service braking system is of the order of 75-80 psi. In that case, if a full brake application is made, the difference in operating pressures between the tractor and trailer systems will be such that the vehicle will be unstable, and jackknifing may occur. Therefore, it is desirable that the vehicle operator be warned, before effecting a service braking application, that a low pressure condition exists in the trailer braking system so that the driver can make compensating adjustments.

A conventional. normally closed pressure operated switch generally indicated by the numeral 82 is connected into the conduit 84 which communicates outlet port 52 to the supply line 26. Normally closed switch 82 responds to a predetermined pressure set point, for example, 75 psi, to connect terminals 86, 88 of the normally closed switch 82 when the pressure is below this predetermined level, and to break the connection between the terminals when the pressure in conduit 84 is above this predetermined level. The terminal 86 is connected to ground, the terminal 88 is connected to a terminal 90 of a standard, normally open pressure operated switch 92, which may be a standard stoplight switch. Stoplight switch 92 is also communicated into the conduit 84. The switch 92 responds to a very low pressure level of a few psi to connect the terminal 90 with terminal 94. Terminal 94 is connected to a conventional warning device 96 in the vehicle operator's compartment. Warning device 96 may either be a warning light on the vehicle dashboard, or perhaps a warning buzzer. The warning device 96 is also connected through the vehicle ignition switch 98 to the vehicle battery.

In operation, during normal vehicle operation with the conduit 84 and supply line 26 at normal operating pressure, switch 92 responds to the pressure level in conduit 84 to close the connection between terminals 90 and 94. However, normally closed switch 82 responds to the pressure in conduit 84 above the trip point of the switch 82 to open the connection between terminals 86, 88, thereby breaking contact with ground and preventing operation of the warning device 96. When the pressure level in conduit 84 drops below the setpoint (for example, 75 psi) of the switch 82 indicating a low pressure condition in the supply line 26 and therefore in the trailer braking system, a switch 82 closes to complete a connection between the terminal 88 and ground, thereby actuating the warning device 96. If the vehicle is run in the "bobtail" mode, control knob 42 is operated to vent the supply line 26 and conduit 84. Accordingly, switch 82 will close, but switch 92 will open, since the normally open stoplight switch 92 responds to venting of the conduit 84 to open the circuit between the terminals 90, 94, thereby disabling the actuation signal to the warning device 96.

I claim:

1. Fluid pressure braking system for a tractor-trailer vehicle comprising a fluid pressure source, a tractor braking system and a trailer braking system including trailer brakes, said trailer braking system including storage reservoirs and valve means responsive to a service control signal for supplying fluid pressure from said reservoirs to actuate said trailer brakes, a supply line connecting the tractor and trailer braking systems for supplying fluid pressure from said source to said storage reservoirs, a control line connecting the tractor and trailer braking systems for communicating said service control signal to said valve means, a warning device for warning the vehicle operator of a braking system malfunction, said tractor protection system including a supply control valve for controlling communication through said supply line, and pressure responsive switch means responsive to the pressure level in the supply line for actuating said warning device when the pressure level in the supply line drops below a predetermined pressure level during normal vehicle operation, said pressure responsive switch means being connected in said supply line between said supply control valve and said trailer braking system.

2. Fluid pressure braking system as claimed in claim 1, wherein said tractor braking system includes a tractor protection valve through which each of said lines communicate for closing off said lines when the pressure level in the supply line drops below a predecided pressure level, said predetermined pressure level being greater than said predecided pressure level whereby said warning device is actuated before the pressure level in said supply line drops to said predecided pressure level.

3. Fluid pressure braking system as claimed in claim 2, wherein said pressure responsive switch means is connected in said supply line between said supply control valve and said tractor protection valve.

4. Fluid pressure braking system as claimed in claim 2, wherein said pressure responsive switch means is connected in said supply line upstream of said tractor protection valve.

5. Fluid pressure braking system as claimed in claim 3, wherein said pressure responsive switch means includes a pressure responsive switch connected in said supply line, said pressure responsive switch closing when the pressure level in said supply line drops below said predetermined level to generate an actuating signal for actuating said warning device.

6. Fluid pressure braking system as claimed in claim 5, wherein said pressure responsive switch means includes disabling means responsive to said supply control valve for disabling said actuating signal when the supply control valve is in the closed condition.

7. Fluid pressure braking system as claimed in claim 5, wherein said pressure responsive switch means includes disabling means responsive to the pressure level in said supply line for disabling said actuating signal when the supply line is below a preestablished pressure level.

8. Fluid pressure braking system as claimed in claim 7, wherein said preestablished pressure level is less than the predecided pressure level.

9. Fluid pressure braking system for a tractor-trailer vehicle comprising a fluid pressure source, a tractor braking system and a trailer braking system including trailer brakes, said trailer braking system including storage reservoirs and valve means responsive to a service control signal for supplying fluid pressure from said reservoirs to actuate said trailer brakes, a supply line connecting the tractor and trailer braking systems for supplying fluid pressure from said source to said storage reservoirs, a control line connecting the tractor and trailer braking systems for communicating said service control signal to said valve means, a warning device for warning the vehicle operator of a braking system malfunction, and pressure responsive switch means responsive to the pressure level in the supply line for actuating said warning device when the pressure level in the supply line drops below a predetermined pressure level during normal vehicle operation, said tractor braking system including a tractor protection valve through which each of said lines communicate for closing off said lines when the pressure level in the supply line drops below a predecided pressure level, said predetermined pressure level being greater than said predecided pressure level whereby said warning device is actuated before the pressure level in said supply line drops to said predecided pressure level, said tractor braking system including a supply control valve for controlling communication through said supply line, said supply control valve being actuateable from a closed condition venting said supply line to an open condition communicating system pressure through said supply line, said pressure responsive switch means being connected in said supply line between said supply control valve and said tractor protection valve, pressure responsive switch means including a pressure responsive switch connected in said supply line, said pressure responsive switch closing when the pressure level in said supply line drops below said predetermined level to generate an actuating signal for actuating said warning device, said pressure responsive switch means including disabling means responsive to the pressure level in said supply line for disabling said actuating signal when the supply line is vented.

10. Fluid pressure braking system as claimed in claim 9, wherein said disabling means is a pressure actuated switch connected in said supply line, said pressure actuated switch being connected between said pressure responsive switch and said warning device so that said pressure actuated switch interrupts said actuating signal when the supply line is vented.

11. Fluid pressure braking system as claimed in claim 9, wherein said pressure responsive switch means includes disabling means responsive to said supply control valve for disabling said actuating signal when the supply control valve is in the closed condition.

12. Fluid pressure braking system as claimed in claim 9, wherein said pressure responsive switch means includes disabling means responsive to the pressure level in said supply line for disabling said actuating signal when the supply line is below a preestablished pressure level.

13. Fluid pressure braking system for a tractor-trailer vehicle comprising a fluid pressure source, a tractor braking system and a trailer braking system including trailer brakes, said trailer braking system including storage reservoirs and valve means responsive to a service control signal for supplying fluid pressure from said reservoirs to actuate said trailer brakes, a supply line connecting the tractor and trailer braking systems for supplying fluid pressure from said source to said storage reservoirs, a control line connecting the tractor and trailer braking systems for communicating said service control signal to said valve means, a warning device for warning the vehicle operator of a braking system malfunction, and pressure responsive switch means responsive to the pressure level in the supply line for actuating said warning device when the pressure level in the supply line drops below a predetermined pressure level during normal vehicle operation, said pressure responsive switch means including a pressure responsive switch connected in said supply line, said pressure responsive switch closing when the pressure level in said supply line drops below said predetermined level to generate an actuating signal for actuating said warning device, said pressure responsive switch means including disabling means responsive to the pressure level in said supply line for disabling said actuating signal when the supply line is less than a preestablished pressure level.

* * * * *